(12) United States Patent
Dev et al.

(10) Patent No.: US 6,940,393 B2
(45) Date of Patent: Sep. 6, 2005

(54) SYSTEM AND METHOD FOR IMPROVED QUEUING, SERVICE-TIME, AND CAPACITY IN DRIVE-THROUGH OPERATIONS

(75) Inventors: Roger H. Dev, Durham, NH (US); Mark Samber, Portsmouth, NH (US)

(73) Assignee: Nimesa Corporation, Portsmouth, NH (US)

(*) Notice: Subject to any disclaimer, the term of this patent is extended or adjusted under 35 U.S.C. 154(b) by 113 days.

(21) Appl. No.: 10/602,703

(22) Filed: Jun. 24, 2003

(65) Prior Publication Data

US 2004/0035643 A1 Feb. 26, 2004

Related U.S. Application Data

(60) Provisional application No. 60/390,954, filed on Jun. 24, 2002, and provisional application No. 60/390,953, filed on Jun. 24, 2002.

(51) Int. Cl.[7] .............................. G08B 5/00; G08G 1/00; G06F 17/00; G06F 17/60; G06K 5/00; B65G 47/00

(52) U.S. Cl. ...................... 340/286.09; 705/15; 705/16; 340/286.06; 340/286.07; 340/286.08; 235/375; 235/380; 235/381; 235/382; 235/383; 235/384; 186/36

(58) Field of Search ..................... 340/286.07, 286.08, 340/286.09, 928; 705/15–16; 235/375, 380–384; 186/36–37

(56) References Cited

U.S. PATENT DOCUMENTS

| | | | | |
|---|---|---|---|---|
| 6,366,220 B1 | * | 4/2002 | Elliott | 340/928 |
| 6,425,524 B2 | * | 7/2002 | Pentel | 235/381 |
| 2002/0138350 A1 | * | 9/2002 | Cogen | 705/15 |

* cited by examiner

*Primary Examiner*—Jeffery Hofsass
*Assistant Examiner*—Lam Pham
(74) *Attorney, Agent, or Firm*—Hayes Soloway PC

(57) ABSTRACT

A system and method of queuing orders locates data-entry modules relative to a pickup location such that a customer who places an order after a customer who placed an earlier order can be signaled to approach a pickup location before the first customer if the order of the second customer is ready before the order of the first customer. The system can signal a customer to wait in a predefined location until the order is ready, or the system can signal the customer to approach the pickup location.

19 Claims, 7 Drawing Sheets

US 6,940,393 B2

SYSTEM AND METHOD FOR IMPROVED QUEUING, SERVICE-TIME, AND CAPACITY IN DRIVE-THROUGH OPERATIONS

CROSS-REFERENCE TO RELATED APPLICATIONS

This application claims priority to copending U.S. Provisional Patent Application Ser. No. 60/390,954 filed Jun. 24, 2002, the entire disclosure of which is incorporated herein by reference in it entirety. This application is also related to copending U.S. provisional patent application entitled "Intelligent Rule-based Promotion Module" filed on Jun. 24, 2002 and accorded Ser. No. 60/390,953 and its corresponding utility patent application filed Jun. 24, 2003, both of which are incorporated herein by reference in their entirety.

FIELD OF THE INVENTION

The present invention relates to the field of drive-through business operations and, more particularly, to drive-through businesses that prepare items to order.

BACKGROUND OF THE INVENTION

Drive-through or curbside delivery is becoming increasingly important in the current restaurant industry. Typically, forty to seventy percent of quick-serve restaurant (QSR) revenues come from drive-through customers, and curbside delivery is becoming an increasingly large component of sales in the fast-casual restaurant segment. Unfortunately, current ordering paradigms are fraught with problems. Specifically, current ordering paradigms utilize a single-queue approach that makes customers with small, quick orders wait behind customers with large complex orders. In addition, system capacity is constrained by processing time of the slowest orders and a practical way to significantly expand capacity is not readily available. These problems result in decreased customer satisfaction and significant loss of revenues. Unfortunately, potential customers may choose another restaurant if they see that the drive-through queue is unacceptably long.

FIG. 1 is a top view of a typical drive-through operation. The restaurant (R) may have a dinning area (DA), an office (O), a kitchen (K), and a drive-through area (DT). A vehicle (V) enters the drive-through along a path (P) and stops at a sign/menu-board (S) that contains a menu along with a microphone/speaker combination. Vehicle traffic along the path (P) is indicated by arrows. A driver is prompted by an order-taker through the speaker and dictates the desired order through the microphone contained in the sign/menu-board (S). Two-way interaction occurs via speaker/microphone interaction. The order-taker wears a headset having a microphone and speaker and is located in the drive-through area (DT). Some restaurants now offer a display device in the vicinity of the sign/menu-board that visually confirms the order contents and the amount owed. In some cases, one or two-way video is also used so that the operator can see the customer (and possibly vice-versa).

Once the order has been confirmed (verbally or by monitor), the driver proceeds toward a drive-through pickup window ($W_P$), in queue behind any previous cars, where the driver submits his payment to a window person and then receives his food. Some restaurants use a two-window system during busy times, whereby the driver pays at a payment window ($W_S$) and receives his food at the pickup window ($W_P$).

Current ordering paradigms have a number of problems, a few of which are listed below.

(1) Service Time—During busy times, customers wait in line behind other cars waiting to be served.

(2) Queuing—A single queue means that customers with short/fast orders (e.g., a drink) have to wait behind customers with large, complex orders. Since queuing is on a strict first-in first-out (FIFO) basis, later customers are generally not served until all previous customers have been taken care of. Therefore a whole line of people with quick orders can be held up by a single complex order.

(3) Capacity—There is little that can be done to increase throughput in current ordering paradigms without major restaurant renovations, such as adding another drive-through lane on the other side of the restaurant. Such a solution is expensive and creates many logistical problems with restaurant traffic flow (both pedestrian and vehicular), and is therefore rarely employed in practice.

(4) Cost—Maximizing the throughput during busy periods requires that two to three people be dedicated to the drive-through process. Unfortunately, throughput is still limited by the service time of the slowest order.

(5) Lost Revenue—Restaurant demand is not a fixed quantity. Queuing is self-limiting. As the line gets longer, more people will choose to bypass the restaurant and dine elsewhere. Revenue stream is limited, to a large degree, by throughput of the drive-through operation.

What is needed is a system that can overcome shortcomings of the current ordering paradigms.

SUMMARY OF THE INVENTION

Embodiments of the present invention provide a system and method for providing improved queuing, service time, and capacity in drive-through operations.

Briefly described, in architecture, one embodiment of the system, among others, can be implemented as follows. A drive-through operation system having a data-receiving module and first and second data entry modules capable of communicating with the data-receiving module. The data entry modules are capable of transmitting data indicative of an order for requested items by a respective first or second customer to the data-receiving module. The data-receiving module being capable of generating a signal that the respective first or second order is available for pickup and transmits the signal to the customer to approach a pick-up location.

The present invention can also be viewed as providing methods of queuing drive-through operations. In this regard, one embodiment of such a method, among other, can be broadly summarized by the following steps: receiving a first order from a first customer, receiving a second order from a second customer; and signaling the first customer to approach a pick-up location if the first order is ready for pickup and signaling the second customer to approach the pick-up location if the second order is ready for pickup.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. Components in the drawings are not necessarily to scale, emphasis instead being placed upon clearly illustrating principles of the present invention. Moreover, in the drawing, like reference numerals designate corresponding parts throughout the several views.

DETAILED DESCRIPTION

The present invention is a system and method for improving queuing, service time, and capacity in drive-through operations. Specifically the system and method is used to process orders for items to be prepared, for example food items ordered through a kiosk at a fast food restaurant.

The present invention can be implemented in hardware, software, firmware, or a combination thereof. In accordance with the exemplary embodiment described below, portions implemented in software or firmware are stored in a memory and are executed by a suitable instruction execution system located in a central processing unit (CPU). Portions implemented in hardware, as in an alternative embodiment, can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 1:
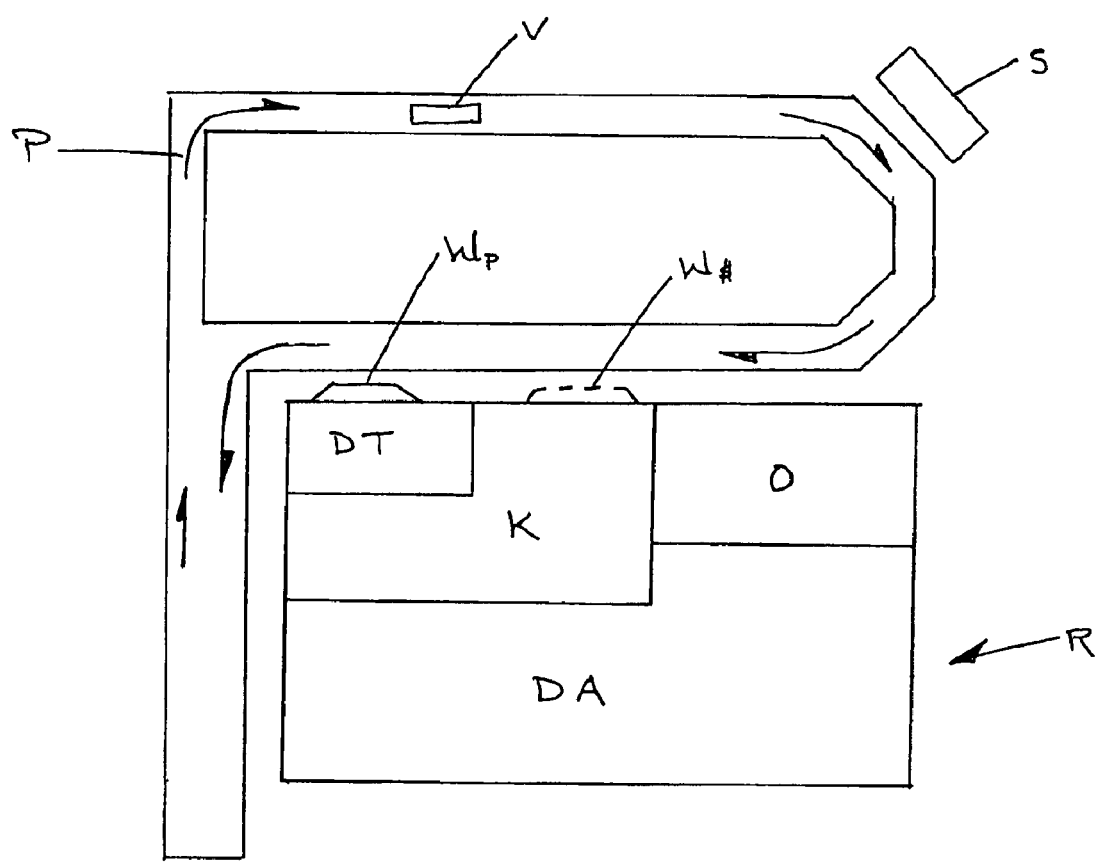
FIG. 1 is a top view of a typical drive-through operation.
Figure 2:
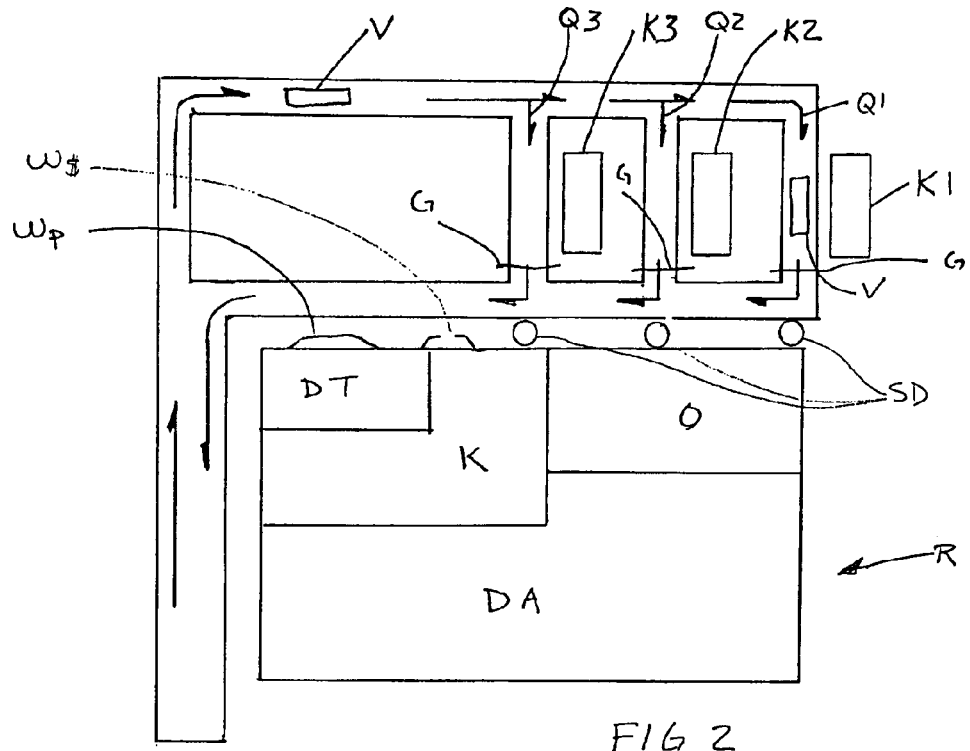
FIG. 2 is a top view of a drive-through operation in accordance with a first exemplary embodiment of the invention.

FIG. 2 is a top view of a drive-through operation in accordance with a first exemplary embodiment of the invention. A description of the drive-through operation follows. Customers approach a restaurant R and are split into multiple (any number) queues Q1, Q2, and Q3, each supported by a data-entry terminal/kiosk K1, K2, K3 respectively, herein after referred to as a "kiosk," which may be self-service. At the kiosk K1, K2, K3, the customer may be able to enter their order and/or pay for their order. The kiosk K1, K2, K3 may accept cash, credit cards, debit cards, speed passes, or other forms of payment. Alternatively, payment may be received at a payment only window $W_S$ or a payment/pickup window $W_P$. Alternatively, payment may be received at a self-service payment kiosk located between the data-entry kiosk K1, K2, K3 and the pickup window $W_P$. At a self-service-kiosk K1, K2, K3, the customer can enter their order using a touch screen or voice commands (i.e., through computer voice recognition). Alternatively, the customer may enter their order using convention methods (i.e. the customer speaks into a microphone in the kiosk K1, K2, K3) and an order taker in the restaurant R manually enters the order. In-vehicle ordering mechanisms, such as a navigation monitor of a vehicle, could be used as well.

After the order has been received, the customer may be signaled either audibly or visually to wait for the order to be prepared. The audible signal may be broadcast over a speaker, preferably located in the kiosk K1, K2, K3. The visual signaling may be accomplished through the kiosk K1, K2, K3, a signaling device SD in view of the customer, or a moveable gate G disposed between the customer and the pickup window $W_P$. The signaling device SD may be a light or message board disposed on the kiosk K1, K2, K3 or in the vicinity of the pickup window $W_P$.

When the order is ready the customer is signaled to approach the pickup window $W_P$ where their food is presented. Benefits of the present invention may include:

(1) Faster service times—Service times are improved dramatically for short orders, yet not impacted for longer orders due to multiple wait queues.

(2) Increased throughput—Multiple orders can be taken and paid for simultaneously. The single drive-through window is no longer a bottleneck, as only order presentation occurs there, with minimal interaction.

(3) Scalable throughput—Throughput can be scaled dramatically with the simple addition of kiosks to meet peak demand requirements.

(4) Cost savings—No human interaction is required for placing or paying for orders. Resources can be redeployed toward kitchen throughput.

(5) Revenue enhancement—Greater throughput and faster service times means shorter lines. Shorter lines means less customer bypass of the restaurant.

Figure 3:
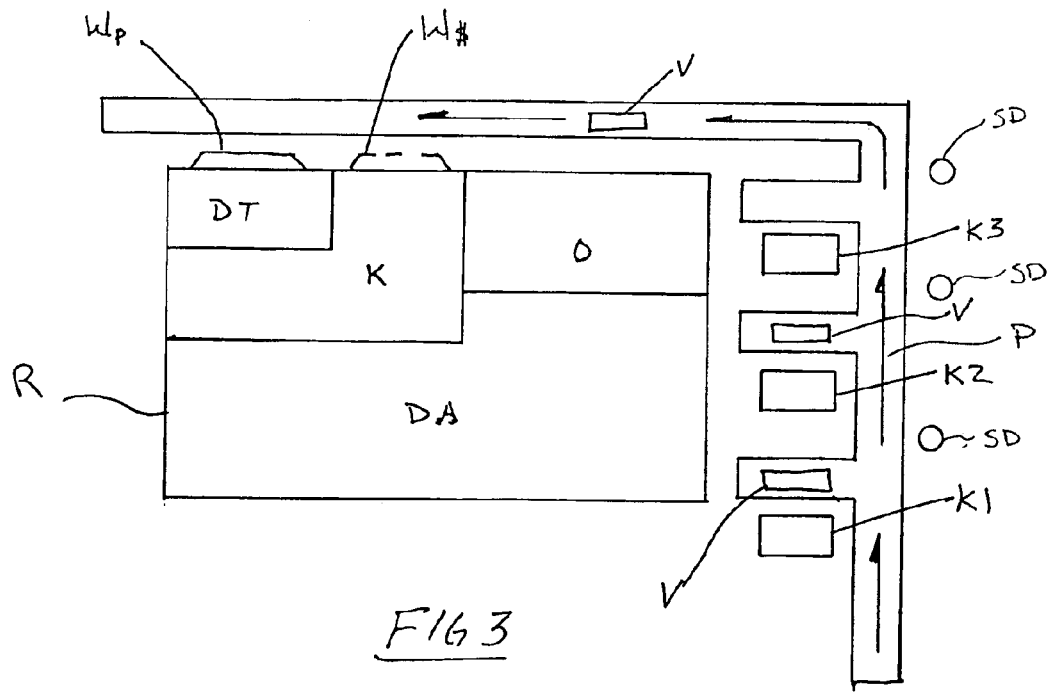
FIG. 3 is a top view of a drive-through operation in accordance with a second exemplary embodiment of the invention.

Not all drive-through operations lend themselves to the configuration in FIG. 2. The same queuing benefits can be realized using many different physical configurations. FIG. 3 is a top view of a drive-through operation in accordance with a second exemplary embodiment of the invention, where kiosks are configured as stalls in a parking lot adjacent the restaurant R. The kiosks K1, K2, K3 are preferably located such that when a vehicle is at a first kiosk K1, a path P from a second kiosk K2 to the pickup window $W_P$ is not impeded by the vehicle at the first kiosk K1. Likewise, the kiosks K1, K2, K3 are preferably located such that when a vehicle is at the second kiosk K2, a path P from the first kiosk K1 to the pickup window $W_P$ is not impeded by a vehicle at the second kiosk K2.

When an order is complete, the appropriate customer can be signaled by a signaling device SD to go to the pickup window $W_P$ to pick up the order. In this configuration, a path from the kiosk K1, K2, K3 to the pickup window $W_P$ is not blocked by other vehicles waiting for their orders to be completed.

Figure 4:
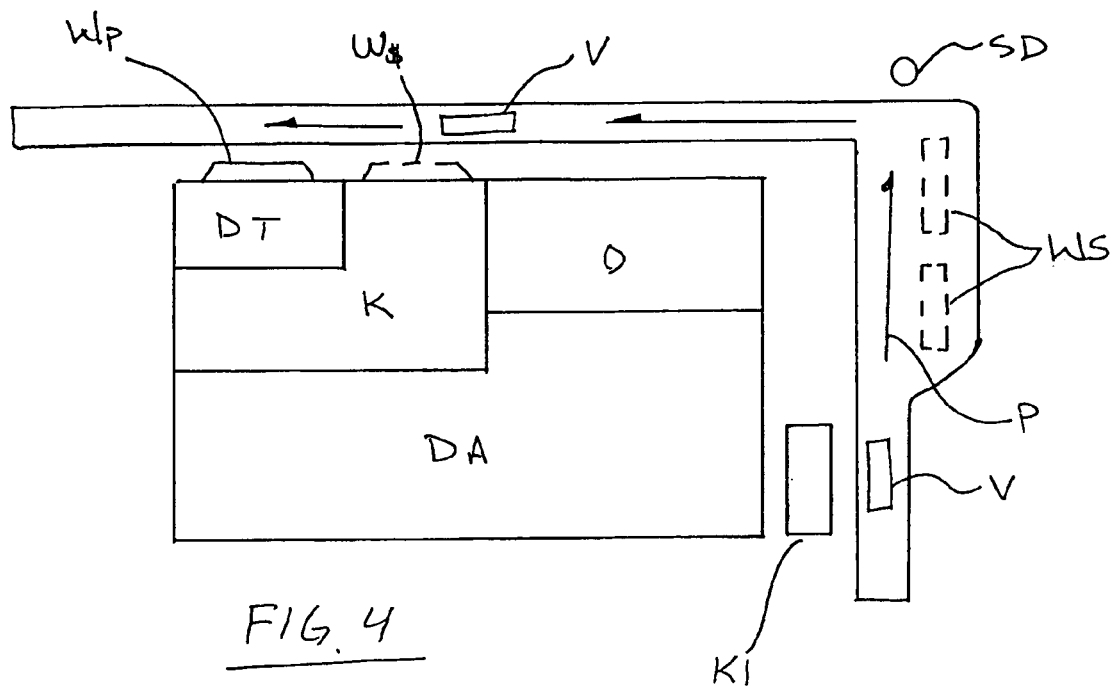
FIG. 4 is a top view of a drive-through operation in accordance with a third exemplary embodiment of the invention.

FIG. 4 is a top view of a drive-through operation in accordance with a third exemplary embodiment of the present invention. As is shown by FIG. 4, a single kiosk K1 may be provided with one or more waiting spaces WS for vehicles V provided between the kiosk K1 and the pickup window $W_P$. The waiting spaces WS are preferably located between the kiosk K1 and the pickup window $W_P$ such that a vehicle V waiting in the waiting space WS does not impede the path P from the kiosk K1 to the pickup window $W_P$. The customer may wait in one of the available waiting spaces WS until signaled either audibly or visually by a signaling device SD to approach the pickup window $W_P$ to pick up the order.

Figure 5:
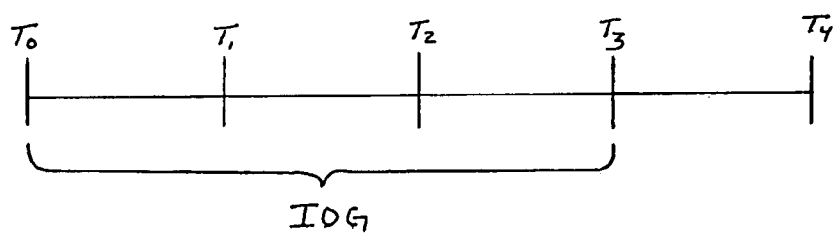
FIG. 5 is a time-line of operational states of a drive-through associated with ordering and picking up.

FIG. 5 is a time-line of the operational states of a drive-through order system. The time line may begin at time $T_0$ when the customer approaches a kiosk and end at a time $T_4$ when the order is received by the customer at a pickup window. Time $T_0$–$T_1$, (Item Selection) is the time associated with the customer reviewing the menu and selecting the desired items. Time $T_1$–$T_2$ (Payment) is the time associated with paying for the desired items. As noted above, payment may be made at the kiosk or a payment window separate from the pickup window. Time $T_2$–$T_3$ (Waiting) is the time associated with the restaurant preparing the items and packaging them for pickup. Time $T_o$–$T_3$ may be referred to as the "inter-order gap." The "inter order gap" is the time period starting from when the customer approaches the kiosk to the time the customer is signaled to approach the pickup window. The present invention makes improvements in the overall inter-order gap time period. Time $T_3$–$T_4$ (pick up) is the time associated with the customer approaching the pickup window and receiving the desired items.

Figure 6:
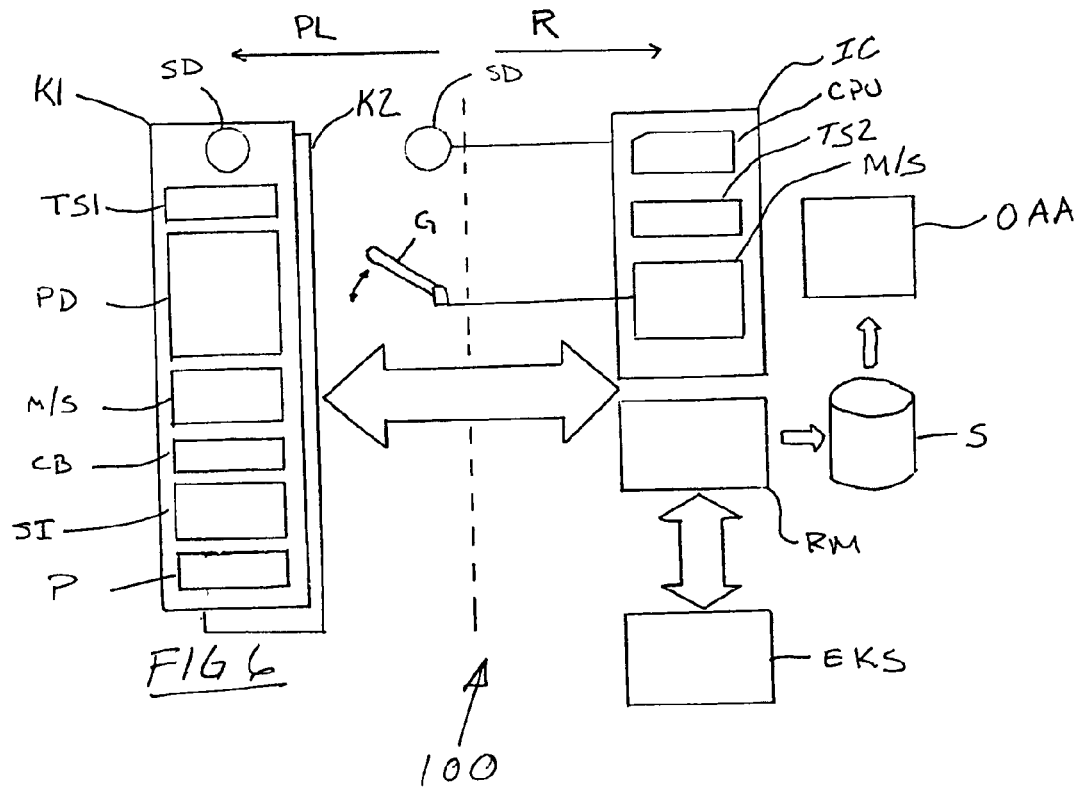
FIG. 6 is a block diagram of a drive-through operation system.

FIG. 6 is a block diagram of a drive-through system 100 for use in the present invention. The system may include one or more data-entry modules, for example kiosks K1, K2 located in the parking lot PL outside a restaurant R. Alternatively, the kiosks K1, K2 may be located in the dining area DA of the restaurant R. The kiosk may have an input device, for example a touch screen TS1, a payment device PD, a microphone/speaker M/S, a call button CB, and a service indicator SI. The kiosks K1, K2 may be coupled to a data-receiving module, for example an in-store console (IC), located within the restaurant R, through a local area network (LAN). The in-store console IC may be a general-purpose computer or an application specific computing device. The in-store console IC may include an input device and an output device, for example a touch screen TS2 and a microphone/speaker M/S, and a central processing unit CPU having a processor, a storage device, a local bus, a communications port, and a power supply.

The in-store console IC may be coupled to a restaurant manager RM, (described below). The restaurant manager RM may also be coupled to an existing kitchen system EKS using any communication media, for example LAN or RS232. An operational analysis application OAA (described below) may be capable of extracting data from the restaurant manager RM and generating useful statistics that are stored within a storage device (S), as is shown by FIG. 6. Examples of useful statistics are listed below.

The service indicator SI, on or near the kiosk K1, may indicate that the kiosk K1 is available and in operation. The service indicator SI may include a pair of lights (e.g., Red and Green) that indicate whether the kiosk K1 is available for use (i.e., in-service or out-of-service). These lights may be visible from a distance and let customers know whether they should enter that lane or avoid the lane. Alternatively a controllable gate G may signal that the kiosk K1 is available and in operation. If a kiosk K1, through its internal diagnostics, detects that it is no longer operational, or if the operator, through the in-store console sets a state of the kiosk to "out-of-service", then the out-of-service indicator will light. Otherwise, the kiosk is considered in-service and the in-service indicator will light.

The customer may select desired items using the touch screen TS1, or the customer may select desired items by simply speaking into the microphone/speaker M/S. The kiosk K1, K2 may employ currently available voice-recognition technology to convert the audible signals into data that can be transmitted to the in-store console IC. The customer may choose a payment method and submit payment (e.g., by credit card, debit card, cash, radio frequency Identification (RFID), or fingerprint identification) through a payment device (PD) at the kiosk K1, K2. If the customer was previously identified, the payment method associated with the identification system (e.g., RFID) can be selected to avoid the need to present the identification again. Alternatively, the customer can opt to pay at a separate payment window $P_S$, or the pick-up window $P_W$.

After payment is received, the customer may receive a receipt with an order number that is presented to the customer via a receipt printer P. The customer may then be signaled to wait for order preparation before approaching the pick-up window $P_W$. The order may be submitted to the existing kitchen system EKS via the Restaurant Manager RM or alternatively a preparation slip may be printed inside the restaurant. As an example, the existing kitchen system EKS may be the existing monitors located in front of the food preparation areas in kitchen K.

When the order has been prepared and assembled, the drive-through operator in the restaurant R may press a symbol for the order number on the in-store console IC, which signals the customer that the order is ready at the pick-up window $P_W$. The customer then presents the receipt at the pickup window $P_W$ and is handed the completed order. The operator then signals the system that the order has been delivered.

It is desirable that a large majority of orders, if not all of the orders, are placed without assistance from a human operator. Occasionally, however, a customer may require assistance or a kiosk K1, K2 may be compromised (e.g., out of printer paper). If a customer needs assistance, the customer may request assistance by pressing a call button CB. This can alternatively be a virtual button on the touchscreen TS1 or a verbal signal, such as saying "Help Me." The kiosk K1, K2 might respond with a "Please Wait" prompt. The system 100 can be programmed via software stored within the CPU, to send a signal to the in-store console IC, which, in turn causes a headset worn by the operator to be connected to the microphone/speaker M/S within the kiosk K1, K2. An audible signal (e.g., beep) alerts the operator that a customer is waiting for assistance. The operator has the ability to change the mode of the display on the in-store console IC by touching/actuating the touch screen TS2 so that the operator is able to see the same display as the customer that is waiting for assistance or being assisted. The operator can either talk the customer through the problem or use his own touchscreen TS2 to complete the order placed by the customer. The system is capable of allowing the operator to toggle back and forth between the screen viewed by the customer and normal functions (e.g., confirming orders), so that the operator can continue to present food to other customers while assisting the customer seeking assistance.

If a second customer requests assistance while a first is being helped, the operator can be signaled, for example, by an audible tone. The in-store console IC then allows the operator to switch to the second customer at that time or leave that customer "on hold" until completing assistance of the first customer.

In this way, the operator can be helping any number of customers while still processing deliveries.

The Restaurant Manager RM records transactional data including food items, payment and customer information, and timings of each step in the process as shown in FIG. 5. The Restaurant Manager RM may be connected to an existing kitchen system EKS that processes the items required, or alternatively, the Restaurant Manager RM can incorporate the existing kitchen system EKS. The Restaurant Manager RM component records a complete set of statistics that, among other uses, allows the store personnel to optimize their operation in terms of bottleneck and cost avoidance. The Restaurant Manager RM is capable of generating statistics and printing the statistics on paper, displaying the data on a video screen or storing the statistics in memory for later use. The statistics may include, but are not limited to:

(1) Queue Utilization—How many queues are in use at any time;
(2) Process Timing (see FIG. 5); and
    Start of order to Item-selection Complete ($T_0$–$T_1$)
    Item-selection Complete to Payment Complete ($T_1$–$T_2$)
    Payment Complete to Order Ready ($T_2$–$T_3$)
    Order Ready to Order Received ($T_3$–$T_4$)
    Inter-order interval ($T_3$–$T_0$)
(3) Throughput per time period.
    Orders processed count
    Food items processed count
    Revenue amount An Operations Analysis Application OAA analyses the statistics and presents them to restaurant personnel to support management decisions, such as, but not limited to:
(1) The needed number of kiosks;
(2) Personnel levels and deployment;
(3) Bottleneck analysis/service improvement areas;
(4) Facility improvement needs; and
(5) Revenue/Cost tradeoffs.

Figure 7:
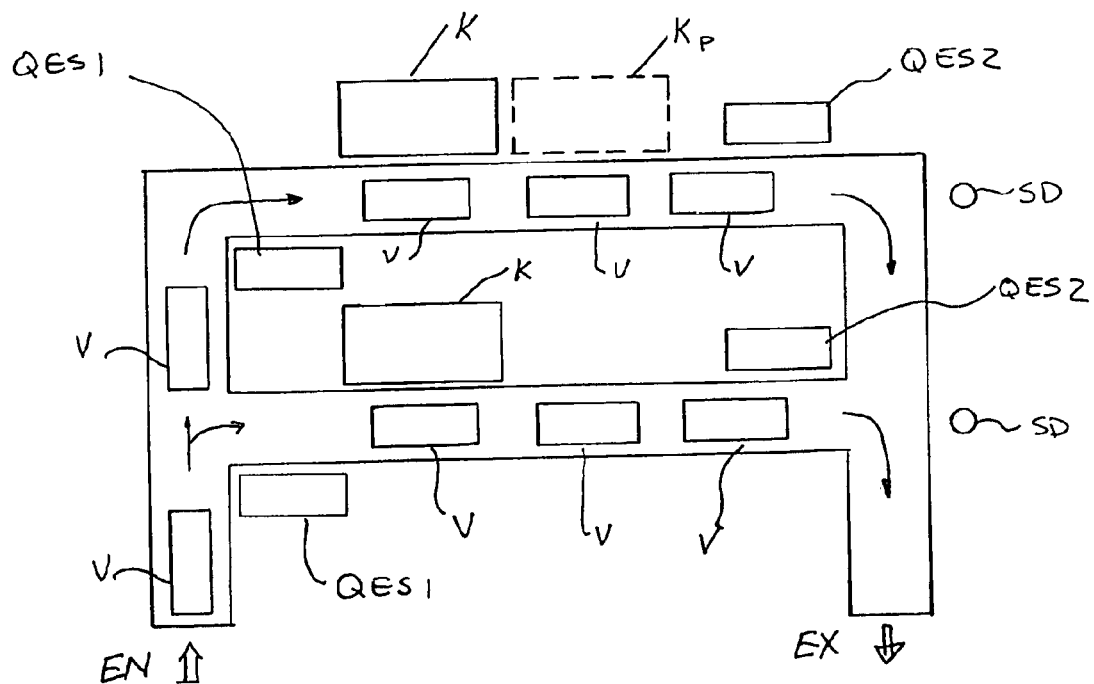
FIG. 7 is a top view of a drive-through operation in accordance with a fourth exemplary embodiment of the invention.

FIG. 7 is a top view of a drive-through operations in accordance with a fourth exemplary embodiment of the invention. The drive-through operation may include Queue Entry Signaling devices QES1, Queue Exit Signaling Devices QES2, kiosks K, and possibly a payment kiosk $K_P$, located between an entrance EN from a street or parking lot and an exit EX, which leads to a pickup window, not shown. The Queue Entry Signaling devices QES1 may use a moveable gate or signaling device SD, for example green and red lights, to allow the customer to enter the queue. The Queue Exit Signaling devices QES2 may also use a moveable gate or signaling device SD to "release" a customer to pick up their food at the pickup window. The Queue Exit Signaling devices QES2 signal the customers when to proceed to the pickup window to get their order. The Queue Exit Signaling devices QES2 provide another opportunity to make adjustments to which vehicle should approach the pickup window next. A separate payment kiosk $K_P$ allows one customer to be ordering while another customer, in the same queue, is paying.

Figure 8:
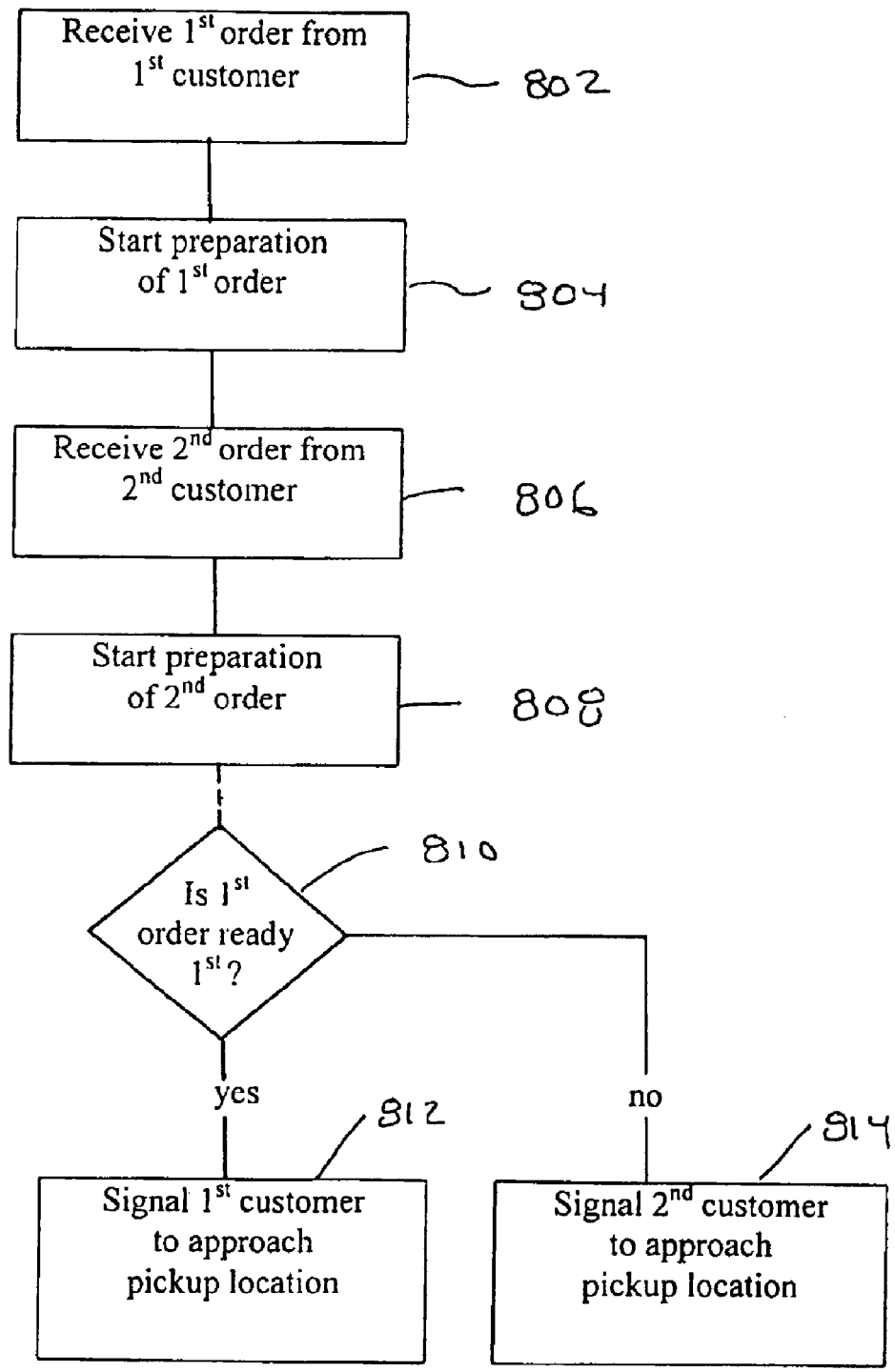
FIG. 8 is a flow chart illustrating a first method of queuing orders in a drive-through operation.

FIG. 8 is a flow chart illustrating a first method of queuing orders in a drive-through operation. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As shown by FIG. 8, a first order is received at a data-receiving module (block 802). As is shown by block 804, preparation of the first order is started. A second order is then received at the data-receiving module (block 806). Preparation of the second order is then started (block 808). A determination is then made as to whether the first order is ready for pick up (block 810). If the system 100 determines that the first order is ready for pickup at the pickup location first, the first customer is signaled to approach the pickup location to pick up their order (block 812). If, however, the system 100 determines that the second order is ready for pickup first, the second customer is signaled to approach the pickup location to pick up their order (block 814).

Figure 9:
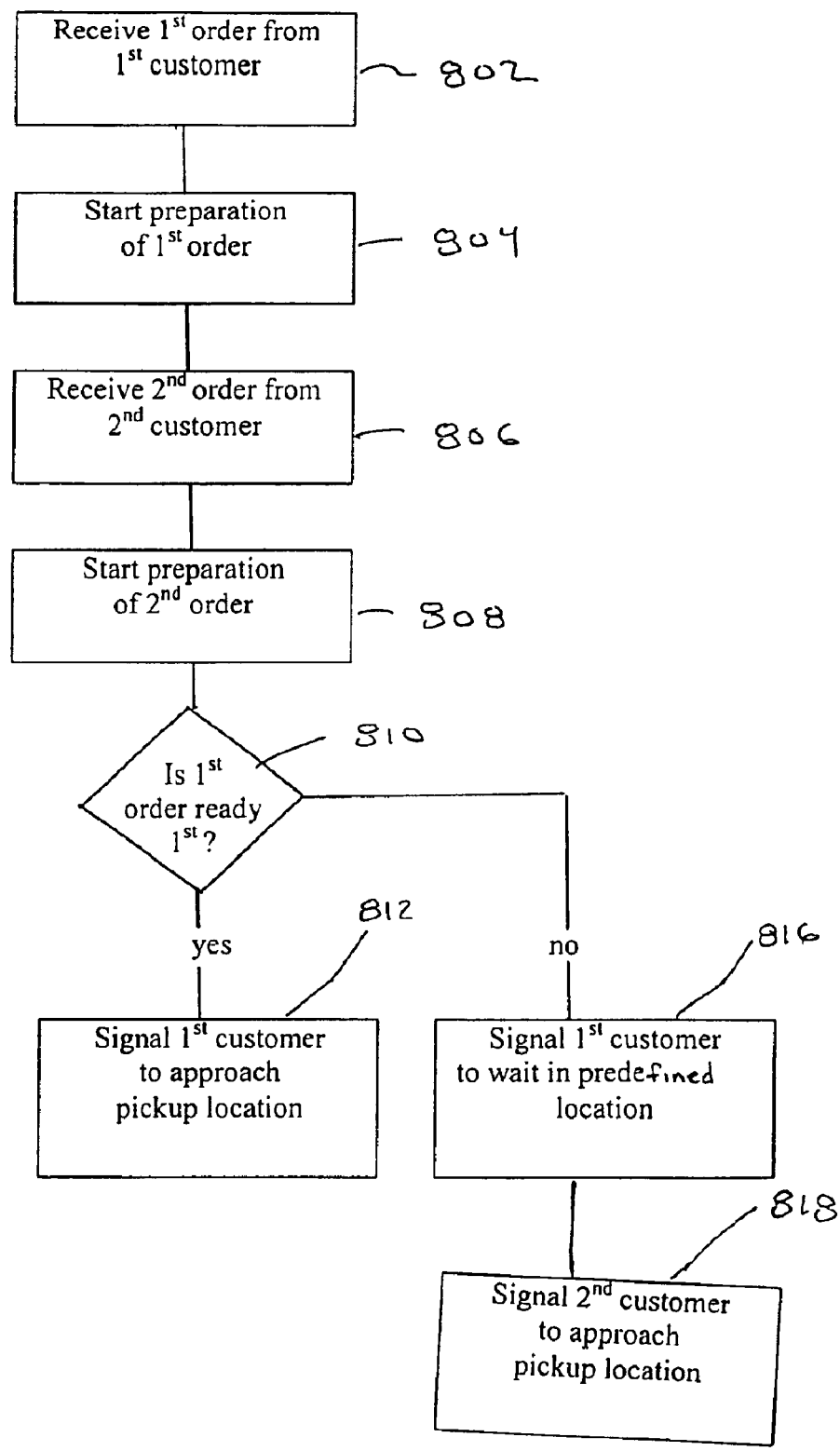
FIG. 9 is a flow chart illustrating a second method of queuing orders in a drive-through operation.

FIG. 9 is a flow chart illustrating a second method of queuing orders in a drive-through operation. As shown by FIG. 9, a first order is received at a data-receiving module (block 802). Preparation of the first order is then started (block 804). A second order is then received at the data-receiving module (block 806). Preparation of the second order is then started (block 808). A determination is then made as to whether the first order is ready for pick up (block 810). If the system 100 determines that the first order is ready for pickup at the pickup location first, the first customer is signaled to approach the pickup location (block 812). If, however, the system 100 determines that the second order is ready for pickup first, the first customer is signaled to wait in a predefined location (block 816) and the second customer is signaled to approach the pickup location to pick up their order (block 818).

Figure 10:
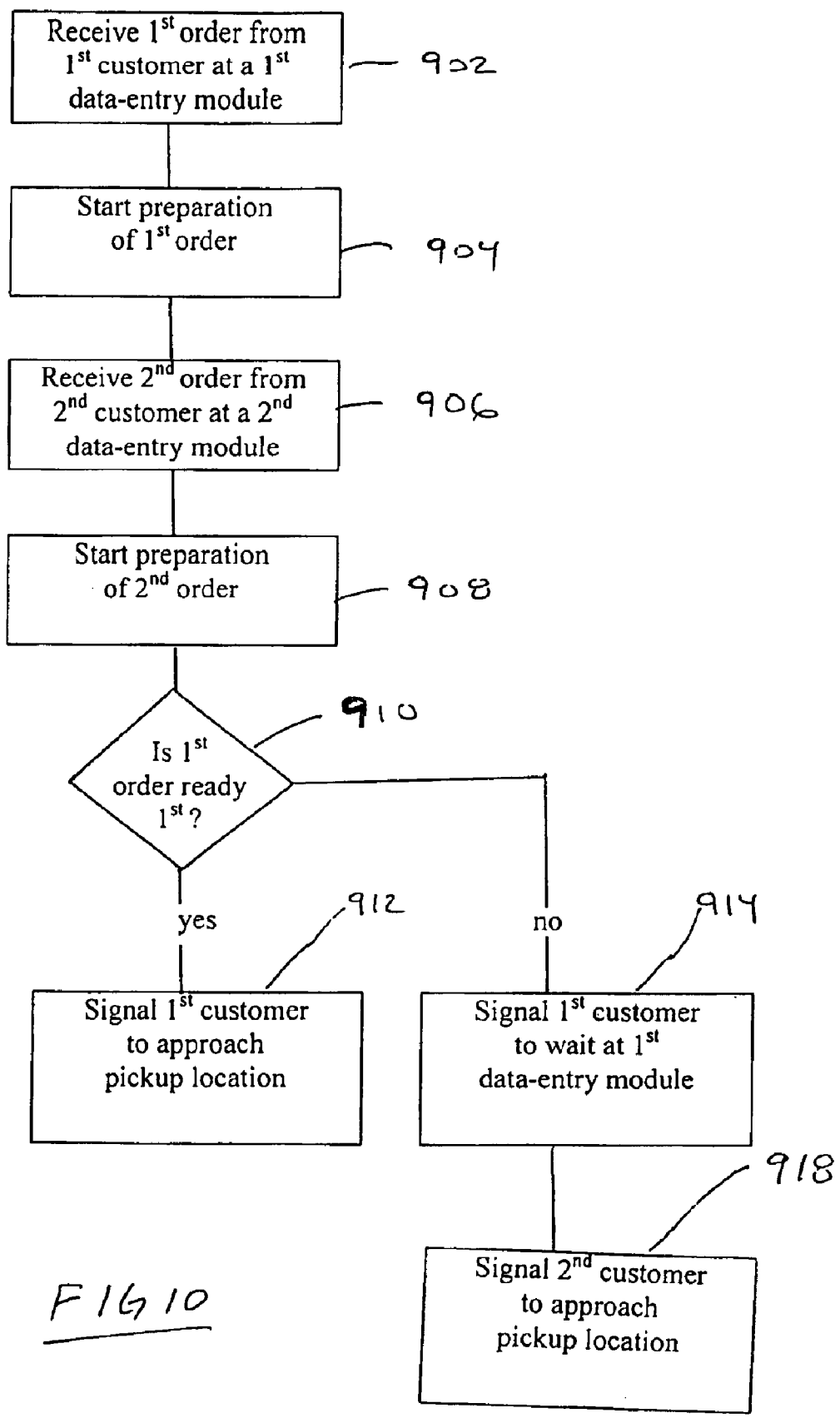
FIG. 10 is a flow chart illustrating a third method of queuing orders in a drive-through operation.

FIG. 10 is a flow chart illustrating a third method of queuing orders in a drive-through operation. As is shown by FIG. 10, a first order is received at a data-receiving module from a first customer at a first data-entry module (block 902). Preparation of the first order is then started (block 904). A second order is then received at the data-receiving module from a second customer at a second data-entry module (block 906). Preparation of the second order is then started (block 908). A determination is then made as to whether the first order is ready for pick up (block 910). If the system 100 determines that the first order is ready for pickup at the pickup location first, the first customer is signaled to approach the pickup location (block 912). If, however, the system 100 determines that the second order is ready for pickup first, the first customer is signaled to wait at the first data-entry module until the first order is ready for pick up at the pickup window (block 914) and the second customer is signaled to approach the pickup location to pick up their order (block 918).

Although the above mentioned embodiments have been disclosed in relation to a drive-through restaurant, the method and system also has applicability for other drive-through applications, such as pharmacies, grocery stores, bakeries, liquor stores, and donut shops, where a customer can place an order and/or pick it up without having to get out of their vehicle.

It should be emphasized that the above-described embodiments of the present invention are merely some possible examples of implementation, set forth for a clear understanding of the principles of the invention. Many variations and modifications may be made to the above described embodiments of the invention without departing substantially from the spirit and principles of the invention. All such modifications and variations are intended to be included herein within the scope of this disclosure and the present invention, and protected by the following claims.

We claim:

1. A drive-through operation system, comprising:
   a data-receiving module;
   a first data-entry module; and
   a second data-entry module, wherein the first data-entry module and the second data-entry module are capable of communicating with the data-receiving module; wherein the data-entry modules are capable of transmitting data indicative of an order for requested items by a respective first or second customer to the data-receiving module, the data-receiving module capable of generating a signal that a respective first or second order is available for pickup and transmitting the signal to the first or second customer to approach a pick-up location.

2. The system of claim 1, wherein the signal is visual.

3. The system of claim 1, wherein the signal is a moveable gate.

4. The system of claim 1, wherein the first data-entry module and the second data-entry module are located along a path coupling the first and second data-entry modules to the pickup location; the first data-entry module located along the path such that a vehicle disposed adjacent to the first data-entry module does not impede the path of a second vehicle traveling from the second data-entry module to the pickup location.

5. A drive-through operation system, comprising:
   a data-receiving module;
   a first data-entry module capable of transmitting data indicative of an order for requested items by a customer to the data-receiving module; and
   a signaling device coupled to the data-receiving module to indicate to the customer when to approach a pickup location to pick up the requested items, wherein the signaling device comprises a moveable gate.

6. The system of claim 5, wherein the signaling device further comprises a light.

7. A method of queuing drive-through operations, comprising the steps of:
   receiving a first order from a first customer;
   receiving a second order from a second customer;
   signaling the first customer to approach a pick-up location if the first order is ready for pickup; and
   signaling the second customer to approach the pick-up location if the second order is ready for pickup.

8. The method of claim 7, further comprising the step of signaling the first customer to wait in a predefined location until a second signal is sent instructing the first customer to approach the pickup location.

9. A method of queuing drive-through operations, comprising the steps of:
   receiving a first order from a first customer located at a data-entry module;
   receiving a second order from a second customer located at the data-receiving module; and
   signaling the first customer to wait in a predefined location between the data-entry module and a pickup window if the second order is ready for pickup before the first order is ready.

10. The method of claim 9, further comprising the step of signaling the first customer to approach the pick-up location when the first order is ready for pickup.

11. A method of queuing drive-through operations, comprising the steps of:
    receiving a first order from a first customer located at a first data-entry module;
    receiving a second order from a second customer located at a second data-entry module;
    signaling the first customer to wait at the first data-entry module until the first order is ready for pickup at a pickup window; and
    signaling the second customer to approach the pickup window.

12. The method of claim 11, further comprising the step of signaling the second customer to approach the pickup window before the first customer if the second order is ready for pickup before the first order is ready for pickup.

13. A drive-through operation system, comprising:
    a pickup window;
    a first data-entry module;
    a second data-entry module; and
    a path coupling the first and the second data-entry modules to the pickup window; the first data-entry module located along the path such that a vehicle disposed adjacent the first data-entry module does not impede the path of a second vehicle traveling from the second data-entry module to the pickup window.

14. The drive-through operation system of claim 13, wherein the first and second data-entry modules include a payment acceptance device for accepting payment for items ordered through the respective data-entry module.

15. The drive-through operation system of claim 13, further comprising a payment acceptance device for accepting payment for items ordered through either the first or the second data-entry module.

16. The drive-through operation system of claim 15, wherein the payment acceptance device is located between the first data-entry module and the pickup window.

17. The drive-through operation system of claim 15, wherein the payment acceptance device accepts one or more of cash and credit cards.

18. A method of queuing drive-through operations, comprising the steps of:
    receiving a first order from a first customer;
    receiving a second order from a second customer; and
    signaling the customer whose order is ready first to approach a pick-up location.

19. The method of claim 18, further comprising the step of signaling the customer whose order is ready second to wait in a predefined location.

* * * * *